United States Patent [19]

Büning

[11] 4,308,359
[45] Dec. 29, 1981

[54] METHOD FOR THE MODIFICATION OF POLYVINYLIDENE FLUORIDE

[75] Inventor: Robert Büning, Troisdorf-Sieglar, Fed. Rep. of Germany

[73] Assignee: Dynamit Nobel AG, Troisdorf, Fed. Rep. of Germany

[21] Appl. No.: 954,060

[22] Filed: Oct. 23, 1978

Related U.S. Application Data

[63] Continuation of Ser. No. 753,153, Dec. 21, 1976, Pat. No. 4,151,225.

[30] Foreign Application Priority Data

Dec. 31, 1975 [DE] Fed. Rep. of Germany ....... 2559260

[51] Int. Cl.$^3$ ........................................... C08F 259/08
[52] U.S. Cl. .................................................... 525/276
[58] Field of Search .................. 260/878 R, 881, 884; 525/276

[56] References Cited

U.S. PATENT DOCUMENTS

| | | | |
|---|---|---|---|
| 3,790,645 | 2/1974 | Murayama | 260/884 |
| 3,798,287 | 3/1974 | Murayama | 260/884 |
| 3,923,621 | 12/1975 | Murayama | 525/276 |

*Primary Examiner*—Paul R. Michl
*Attorney, Agent, or Firm*—Sprung, Felfe, Horn, Lynch & Kramer

[57] ABSTRACT

A graft polymer of polyvinylidene fluoride wherein the polyvinylidene fluoride has grafted thereon a polymer of an ethylenically unsaturated compound and a process for preparing such graft polymer by contacting polyvinylidene fluoride with a monomer of an ethylenically unsaturated compound in the presence of a radical forming catalyst while the polyvinylidene fluoride is maintained in the solid phase under conditions for polymerization of the ethylenically unsaturated compound.

17 Claims, No Drawings

METHOD FOR THE MODIFICATION OF POLYVINYLIDENE FLUORIDE

This is a continuation, of application Ser. No. 753,153, filed Dec. 21, 1976 now U.S. Pat. No. 4,151,225.

BACKGROUND OF THE INVENTION

1. Field Of The Invention

This invention relates to graft copolymers of polyvinylidene fluoride and to methods for their preparation. More especially this invention relates to graft copolymers of polyvinylidene fluoride and ethylenically unsaturated compounds especially vinyl compounds and olefins. This invention is also directed to a process for the preparation of such copolymers by contacting polyvinylidene fluoride in the solid phase with a radical forming catalyst and an ethylenically unsaturated monomer maintaining the ethylenically unsaturated compound at polymerization conditions while in the presence of said radical forming catalyst.

2. Discussion Of The Prior Art

It is known that polyvinylidenefluoride (PVDF) has a very good resistance to chemicals and therefore is used in the manufacture of products which are exposed to aggressive chemicals. On the other hand, unmodified PVDF also has a number of undesirable characteristic which in many cases conflict with its application, or make it difficult or impossible to fabricate. For example, the ability of unmodified PVDF to adhere to plastics or even to many metals is poor, so that adhesivizing agents must be used, which result in a certain improvement of adhesion. When adhesivizing agents are used, however, and especially when thin films are to be applied to a substrate, it is often found that the adhesivizing agent migrates into the PVDF and adversely affects its chemical resistance.

The poor adhesion proves especially troublesome in the production of laminates or extruded products. In the presence of heat there is a bond, but upon cooling the bond is lost, so that without the addition of adhesivizing agents such bonding is virtually impossible.

The modification of PVDF with other fluoropolymers does not solve the problem. Furthermore, it is known, for example, through U.S. Pat. No. 3,790,645, to prepare polymers from PVDF and methyl methacrylate, whose electrical characteristics are better than those of unmodified PVDF. There is no mention in this disclosure, however, of any improvement of the adhesiveness of these polymers. These polymers are prepared in aqueous phase, the polymerization being performed in the presence of wetting agents and of the same catalyst which is used in the polymerization of the vinylidene fluoride. The polymer that is obtained by this process, however, has the disadvantage that it is attacked by the solvents for the second polymer. For example, in the case of a PVDF copolymerized with polymethylmethacrylate, virtually all of the polymethylmethacrylate is dissolved out of it by tetrahydrofuran, so that in a polymer of this kind some of the physical properties of the on-polymerized material persist.

It is an object of this invention, therefore, to provide a PVDF polymer having improved adhesivizing characteristics, It is another object of this invention, therefore, to provide a PVDF polymer composition which will more readily adhere to substrates such as inorganic oxidic or metallic surfaces with or without assistance from an adhesivizing agent. It is an object of this invention furthermore, to provide a simple means for the preparation of such PVDF composition.

SUMMARY OF THE INVENTION

In accordance with the objects of this invention there is provided a graft polymer of a polyvinylidene fluoride wherein the polyvinylidene fluoride has graft thereon a polymer of an ethylenically unsaturated compound.

In accordance with this invention it has been discovered that improved physical characteristics are imparted to polyvinylidene fluoride compositions of the same is formed into a polyvinylidene fluoride graft copolymer in which the comonomer is a monomer of an ethylenically unsaturated compound especially a vinyl monomer, acrylonitrile, styrene or an olefin. It has been discovered that graft copolymers of improved physical characteristics based on polyvinylidene fluoride can be prepared if the polyvinylidene fluoride is maintained in the solid phase and in such phase is contacted with a radical forming catalyst and the ethylenically unsaturated monomer. By carrying out such a process the ethylenically unsaturated monomer is permitted to penetrate in or be absorbed within the polyvinylidene fluoride and to polymerize under polymerization conditions applicable thereto.

These graft copolymers, in contrast to the copolymers of German "Offenlegungsschrift" No. 2,141,617, are resistant to solvents for polymethacrylic compounds and surprisingly have even better working properties than unmodified polyvinylidenefluoride. The PVDF modified in this manner, even without the aid of adhesivizing agents, has an improved strength of adhesion to plastics, metals or other substrates having inorganically oxidic surfaces, without the occurrence of migration phenomena. Furthermore, the graft copolymers of the invention have an improved workability, which is shown by the fact that in extrusion, for example, the output per unit of time is greater than in the case of unmodified PVDF.

Also subject matter of the present invention is a method of preparing graft copolyers of polyvinylidene fluoride, by a process in which a radical forming catalyst and an ethylenically unsaturated monomer are made to penetrate in such an amount into a polyvinylidene fluoride in the solid phase that the solid phase of the latter is sustained. Then the graft copolymerization is performed by heating in the absence of water and/or solvent.

The polyvinylidene fluoride usable as the stock can be either in powder or in granule form. Its melt flow index (MFI) as measured in accordance with DIN No. 53,735 (at 265 deg. C. and 12.5 kp loading) should be between 0.1 and 300. It can also be copolymerized with other polymerizable compounds in small amounts, up to 15 wt.-%, or it can be compounded with them within the same limit.

The amount of the monomer must be selected such that the powdered or solid state of the PVDF particles is sustained. The amount of monomer therefore must not be so great as to produce cementing much less a dissolving of the PVDF in the monomer. The saturation pressure of the monomer is never allowed to be reached.

The polymerization begins, depending on the monomer and catalyst used, at an only slightly elevated temperature. It is generally performed at temperatures between 20 and 150 deg. C. It is preferable to use for the graft polymerization the temperature range at which the monomer normally polymerizes; more preferably, however, a slightly higher temperature range is selected. Homopolymerization does not take place or does so to a minor extent, since the catalyst is in the solid phase.

The amount of the scion monomer can be varied within wide limits. Thus, graft copolymers containing between 0.5 and 98% of ongrafted monomer can be prepared. In the case of a content of more than about 20%, however, the monomer must be added and polymerized in portions so as to be able to operate below the saturation pressure in the solid phase. The preferred content of the cion monomer is between 0.5 and 30 wt.-% with respect to the graft copolymer.

The monomers suitable for the ongrafting include all of the compounds available for radical polymerization which contain ethylenically unsaturated double bonds. They include, in addition to the previously mentioned methacrylates, the acrylates, vinyl halides (e.g., vinyl chloride, vinyl fluoride, vinylidene fluoride), vinyl esters (e.g., vinyl acetate), olefins (e.g., ethylene, propylene) or mixtures of these compounds. However, acrylonitrile or styrene can also be grafted in accordance with the invention.

Known catalysts which are usable in radical polymerization, such as for example organic peroxides or azo compounds, can be used as catalysts in accordance with the invention. The peroxides include, for example, dilauroyl peroxide, benzoyl peroxide, or percarbonates, such as dicetyl percarbonate or diisopropyl percarbonate, or peresters such as tert-butylperoxybenzonate. An example of a catalytically active azo compound is azoisobutyric acid dinitrile.

The catalyst can be dissolved in the monomer and allowed to diffuse together with the monomer into the PVDF. However, the catalyst can also be dissolved in a suitable solvent that is easily removable, and in the form of this solution it can be admixed to the polymer such that it will diffuse into the PVDF. Then the solvent is removed again. The polymer prepared in the last-described manner can then be further treated with the scion monomer either immediately or after a long period of storage that can amount to several months. This procedure has the advantage that a basic polymer is made available, onto which a polymerizable monomer can be grafted at any time without the addition of a catalyst, especially when the monomer is a gaseous one.

If it is desired to cause the catalyst to diffuse together with the monomer into the PVDF, a practical procedure is to dissolve the catalyst in the monomer and mix the solution with PVDF in a closed reaction vessel. Then heat is applied with the exclusion of oxygen. The initially liquid phase of the monomer will vanish and will gradually be completely absorbed by the polymer. The heating, and hence the initiation of the polymerization, is best not started until the liquid phase has been completely absorbed.

The amount of the catalyst will amount to between 0.01 and 5 wt.-% with respect to the monomer, depending on the kind of scion monomer that is used.

The grafting can be performed in plastic fabricating machines such as extruding machines, for example. In this kind of fabricating it is recommendable to use a granulated polyvinylidene fluoride which already contains the catalyst for the polymerization of the monomer.

The graft copolymers having a content of ongrafted monomer ranging from 0.5 to 30% by weight can be fabricated alone or in combination with other polymers. Since these graft copolymers are prepared without the use of solvents or water, scion branches can be obtained which in themselves have molecular weights which are more or less the same as those which are achieved by the homopolymerization of the corresponding monomer in substance at the same temperatures. By varying the length of the scion branches, the compatibility and the adhesion to the desired substrate can be adjusted to a desired maximum value.

The graft polymers of the present invention are generally prepared from polyvinylidene fluoride having a molecular weight between $500.10^3$ and $10.10^3$ preferably between $200.10^3$ and $20.10^3$, determined osmotic in DMF at 90° C.

The scion branches themselves have molecular weights within the range of $10.10^3$ to $500.10^3$ preferably between $5.10^3$ and $200.10^3$, determined osmotic in DMF at 90° C.

Generally speaking therefore the graft copolymer itself has a molecular weight between $1000.10^3$ and $21.10^3$ preferably between $800.10^3$ and $30.10^3$, determined osmotic in DMF at 90° C.

In order to more fully illustrate the nature of the invention and the manner of practicing the same the following examples are presented.

EXAMPLES

EXAMPLE 1

163 g of polyvinylidene fluoride with a melt flow index of 10 (measured at 265 deg. C. and 12.5 kp of loading, in accordance with DIN 53,735) and a solution of 0.7 g of dilauroyl peroxide in 30.0 g of distilled methacrylic acid methyl ester are placed, with the exclusion of oxygen, in a one-liter glass autoclave equipped with a margin traveling band mixer as stirrer. The stirrer is driven at 200 rpm. The temperature is slowly increased over a period of 3 hours to 70 deg. C. Then another 51.5 g of methacrylate is charged. The methacrylic acid methyl ester and the dilauroyl peroxide are entirely absorbed by the polyvinylidene fluoride. After 20 hours of polymerization time, the autoclave is evacuated (water-jet pump, 2 hours) to remove the residual monomer. The yield is 238.6 g.

The graft copolymer thus obtained is extracted with acetic acid ethyl ester in a Soxhlet apparatus for 8 hours. 8.5 wt.-% is extracted. The extract consists of methacrylic acid methyl ester-rich graft polymer of low molecular weight and a small content of polymethylmethacrylate. By this method graft copolymers of poly-1,1-difluoroethylene with methylmethacrylate are obtained in high grafting yields.

EXAMPLE 2

Example 1 is repeated with the difference that 81.5 g of distilled vinyl acetate is used instead of 81.5 g of methyl methacrylate. The reaction conditions are the same as in Example 1. 237.6 g of graft copolymer is obtained. It is extracted with methanol for 8 hours in the Soxhlet apparatus. 7.5 weight-percent is extracted.

EXAMPLE 3

Example 1 is repeated with the difference that 81.5 g of styrene (distilled) is used instead of 81.5 g of methyl methacrylate, and 0.7 g of azoisobutyric acid dinitrile (commercial name Profor N) is used instead of 0.7 g of dilauroyl peroxide. 232.6 g of graft copolymer is obtained. The graft copolymer is extracted with acetic acid ethyl ester for 8 hours in the Soxhlet apparatus, 9.2 wt-% being extracted.

If the polymerization is continued at 130 deg. C. for 3 hours, the extract amounts to only 4.5 wt.-%.

EXAMPLE 4

Example 1 is repeated, with the difference that, instead of 81.5 g, a single addition is made of 24.45 g of methylmethacrylate and 0.315 g of dilauroyl peroxide. 184.8 g of the graft copolymer is obtained.

EXAMPLE 5

Example 1 is repeated, with the difference that, instead of 81.5 g, a single addition is made of 12.25 g of methyl methacrylate, and the amount of the catalyst is only 0.158 g of dilauroyl peroxide. 174.2 g of graft copolymer is obtained.

The mechanical and chemical characteristics of the products obtained in Examples 4 and 5 do not differ substantially from those of the polyvinylidene fluoride that is used. Workability (adhesive strength, extrudability), however, is substantially improved.

EXAMPLE 6

220 g of polyvinylidene fluoride and 0.8 g of dilauroyl peroxide are mixed in a one-liter glass autoclave equipped with a band stirrer. Then, after the addition of 55 g of vinyl chloride, the mixture is stirred, first at 20 deg. C. for 30 minutes, then at 30 deg. C. for another 30 minutes. Then the autoclave is relieved of pressure at 30 deg. C. and evacuated at 1 mm Hg, whereby all of the vinyl chloride used as the solvent for the catalyst is removed.

The product obtained is stable in storage and can be used at any time directly for a graft polymerization in the solid phase.

EXAMPLE 7

220 g of PVDF and 0.8 g of dilauroyl peroxide are charged into the autoclave as in Example 6. After the monomeric vinyl chloride has been removed by evaporation, the power obtained is transferred to a two-liter steel autoclave equipped with a band stirrer. The autoclave is flushed out three times with monomeric vinylidene fluoride at room temperature.

After the autoclave jacket temperature has been adjusted to 85 deg. C., monomeric vinylidene fluoride is pumped in to a pressure of 150 atmospheres gauge. At the end of 20 minutes, the pressure has risen to 155 atmospheres. By varying the jacket temperature, the pressure is then maintained constant at 150 atmospheres for three hours. At the end of this time the jacket temperature is again at 85 deg. C. Thereupon the pressure decreases as the temperature remains constant. After another two hours it has fallen to 115 atmospheres.

The autoclave is now relieved of pressure, and 425 g of a powdered PVDF is obtained.

This example shows that it is possible by means of the process of the invention to perform a mass polymerization with gaseous vinylidene fluoride without producing any clumping of the polymer.

In like manner, other gaseous monomers, such as ethylene and propylene, can be grafted on.

What is claimed is:

1. A graft polymer of polyvinylidene fluoride wherein the polyvinylidene fluoride has grafted thereon at least 0.5 percent by weight and up to 98 percent by weight of a polymer of an ethylenically unsaturated compound selected from the group consisting of styrene, a vinyl halide and an olefin prepared by contacting in the solid phase polyvinylidene fluoride with a monomer of an ethylenically unsaturated compound selected from the group consisting of styrene, a vinyl halide and an olefin and diffusing said monomer and a radical forming catalyst into said polyvinylidene fluoride in such an amount that said polyvinylidene fluoride remains in the solid phase and thereafter maintaining said polyvinylidene fluoride in the solid phase under polymerization conditions for said ethylenically unsaturated compound and polymerizing said ethylenically unsaturated compound in the absence of water and/or solvent.

2. A graft polymer of polyvinylidene fluoride wherein the polyvinylidene fluoride has grafted thereon at least 0.5 percent by weight and up to 98 percent by weight of a polymer of methylmethacrylate and said graft polymer is insoluble in tetrahydrofuran prepared by contacting in the solid phase polyvinylidene fluoride with methylmethacrylate and diffusing said methylmethacrylate and a radical forming catalyst into said polyvinylidene fluoride in such an amount that said polyvinylidene fluoride remains in the solid phase and thereafter maintaining said polyvinylidene fluoride in the solid phase under polymerization conditions for said methylmethacrylate and polymerizing said methylmethacrylate in the absence of water and/or solvent.

3. A graft polymer of polyvinylidene fluoride when the polyvinylidene fluoride has grafted thereon at least 0.5 percent by weight and up to 98 percent by weight of a polymer of an ethylenically unsaturated compound which graft polymer is resistant to solvents for polymethacrylic compounds prepared by contacting in the solid phase polyvinylidene fluoride with a monomer of an ethylenically unsaturated compound and diffusing said monomer and a radical forming catalyst into said polyvinylidene fluoride in such an amount that said polyvinylidene fluoride remains in the solid phase and thereafter maintaining said polyvinylidene fluoride in the solid phase under polymerization conditions for said ethylenically unsaturated compound and polymerizing said ethylenically unsaturated compound in the absence of water and/or solvent.

4. A graft polymer of polyvinylidene fluoride when the polyvinylidene fluoride has grafted thereon at least 0.5 percent by weight and up to 98 percent by weight of a polymer of an ethylenically unsaturated compound which graft polymer is resistant to tetrahydrofuran prepared by contacting the solid phase polyvinylidene fluoride with a monomer of ethylenically unsaturated compound and diffusing said monomer and a radical forming catalyst into said polyvinylidene fluoride in such an amount that said polyvinylidene fluoride remains in solid phase and thereafter maintaining said polyvinylidene fluoride in the solid phase under polymerization conditions for said ethylenically unsaturated compound and polymerizing said ethylenically unsaturated compound in the absence of water and/or solvent.

5. A graft polymer according to claim 1 wherein said compound is styrene.

6. A graft polymer according to claim 1 wherein said compound is a vinyl halide.

7. A graft polymer according to claim 1 wherein said compound is an olefin.

8. A graft polymer according to claim 6 wherein said vinyl halide is vinyl chloride.

9. A graft polymer according to claim 6 wherein said vinyl halide is vinyl fluoride.

10. A graft polymer according to claim 6 wherein said vinyl halide is vinylidene fluoride.

11. A graft polymer according to claim 6 wherein said olefin is ethylene.

12. A graft polymer according to claim 6 wherein said olefin is propylene.

13. A graft polymer according to claim 1 wherein said polyvinylidene fluoride has a melt flow index at 265° C. and 12.5 kp load of between 0.1 and 80.

14. A graft polymer according to claim 1 wherein the polymer of the ethylenically unsaturated compound is present in the graft polymer composition in an amount between 0.5 and 30 weight percent based on the weight of the graft copolymer.

15. A graft polymer according to claim 1 wherein the graft polymer itself has a molecular weight between $1000 \times 10^3$ and $21 \times 10^3$.

16. A graft polymer according to claim 15 wherein the polyvinylidene fluoride portion of the graft polymer has a molecular weight between $500 \times 10^3$ and $10 \times 10^3$.

17. A graft polymer according to claim 16 wherein the scion branch of the graft polymer corresponding to the polymer of the ethylenically unsaturated compound has a molecular weight within the range of $1 \times 10^3$ to $500 \times 10^3$.

* * * * *